United States Patent [19]
Fadell

[11] Patent Number: 5,585,180
[45] Date of Patent: Dec. 17, 1996

[54] METHOD OF PREPARING GLASS MICROFIBERS FOR USE IN COMPOSITES AND FLOWABLE MICROFIBER PRODUCTS

[75] Inventor: James A. Fadell, Toledo, Ohio

[73] Assignee: Schuller International, Inc., Denver, Colo.

[21] Appl. No.: 426,560

[22] Filed: Apr. 12, 1995

Related U.S. Application Data

[62] Division of Ser. No. 122,267, Sep. 16, 1993, abandoned.
[51] Int. Cl.$^6$ .......................... B32B 19/00; D01D 10/00
[52] U.S. Cl. .................. 428/357; 428/402; 23/313 P; 23/313 R; 241/5; 241/18; 264/115; 264/117; 264/121; 425/222
[58] Field of Search ............................ 264/115, 117, 264/121, 128; 241/5, 15, 18; 428/357, 402, 903; 23/313 R, 313 P; 75/236; 425/222

[56] References Cited

U.S. PATENT DOCUMENTS 3,584,796  6/1971  Earle ........................................ 241/18
3,617,004  11/1971  Hyland, Jr. ................................ 241/15
3,663,120  5/1972  Fortunski ................................ 416/224
3,709,833  1/1973  Thomas ..................................... 502/8
4,164,534  8/1979  Ogino ...................................... 264/117
4,344,906  8/1982  Kitagawa et al. ......................... 264/128
5,269,993  12/1993  Shimizu et al. .......................... 264/117

Primary Examiner—Robert A. Dawson
Assistant Examiner—Kenneth M. Jones
Attorney, Agent, or Firm—Cornelius P. Quinn

[57] ABSTRACT

Glass microfibers having diameters of less than one micron are useful in engineered plastics to achieve very smooth surfaces and thermal stability in composite parts. As made, glass microfibers are very bulky and intertwined making it impossible to meter and feed the material using conventional equipment. The processes used for chopping and milling coarser glass fibers to prepare them for engineered plastic composites are unsatisfactory for glass microfibers for various reasons. It has been discovered that flowable glass microfiber agglomerate products can be made by processing the microfiber in a muller mill or in a self impact mill.

12 Claims, 2 Drawing Sheets

METHOD OF PREPARING GLASS MICROFIBERS FOR USE IN COMPOSITES AND FLOWABLE MICROFIBER PRODUCTS

This application is a division of application Ser. No. 08/122,267, filed Sep. 16, 1993, and now abandoned.

BACKGROUND

Glass microfibers are well known and are discussed in U.S. Pat. No. 4,167,404, which patent is hereby incorporated by reference. It is also known to add glass microfibers to plastics to strengthen and stabilize the plastic while producing parts having very smooth surfaces as disclosed in U.S. patent application Ser. No. 07/758,646 filed Sep. 12, 1991, now Pat. No. 5,232,771, which disclosure is hereby incorporated by reference.

Glass microfibers, because of their various lengths and very small diameters of less than about 4.0 microns, are removed from the air stream in which they are made in bulk form and baled under compression. When removed from the bale the bulk expands to less than about 4 pounds per cubic foot (PCF).

The difficulty of using microfibers in engineered plastics or composites is reducing this bulky mass to a form that will allow the fibers to be metered into the liquid plastic at a commercially feasible rate and cost while maintaining the characteristics of the fibers that provide stability, rigidity and strength to the plastic composite. Others have found that the microfiber bulk fiber could be reduced to a form suitable for laboratory work using a high speed tow cutter or chopper similar to the device shown in U.S. Pat. No. 3,815,461. This process produced a fiber product that could be introduced into plastic and the reinforced plastic parts made from this product had the properties desired.

The fiber product produced by this chopper had a bulk density of about 8.1 PCF, but this nodulating method required hand feeding of the bulk fiber to the chopper and the chopping process was very dusty since this equipment is not very amendable to an enclosed system. Another big problem was that the blades became too dull to cut after processing only about 50 pounds requiring shut down to change blade rolls. This situation was too costly and a much better attrition method was needed to make the product commercially feasible.

It is known to ball mill or hammer mill large diameter glass fibers, such as 10–23 microns, into very short fibers to put into plastics. However, when glass microfibers are so processed the properties are not retained or the fiber is not sufficiently agglomerated to a form that can be accurately metered and rapidly fed into the extruder of a plastic pellet making machine. Ball milling was investigated using an 1-HSA Attritor made by the Union Process Company of Akron, Ohio. The mill was successful in overcoming most of the process problems encountered with the chopper, but the properties in the plastic parts were unsatisfactorily degraded. The best properties were achieved using a milled microfiber having a bulk density of about 3.7 PCF, which is lower than desired and the plastic properties still were not satisfactory.

Hammer milling produced a product resembling goose down which was too low in density and too fluffy to facilitate metering and feeding to an extruder, particularly at practical rates.

BRIEF DESCRIPTION OF THE INVENTION

Applicant has discovered that two processes quite different than the chopper, hammer mill or the ball mill processes, produce a microfiber product having surprising and desirable flow characteristics and performance for this type of material. When processed in accordance with the present invention the resultant product is in the form of small agglomerates resembling sawdust or cotton linters. The first process is the centuries old muller process and the second process is self impact milling. The microfiber suitable for use in making reinforced plastic parts having very smooth surfaces have diameters below about 4 microns and preferably mean fiber diameters, as measured by B.E.T. surface area using Krypton as the absorbate, of no greater than 1 micron and most preferably no greater than about 0.65 microns.

In the first process of converting bulk form glass microfibers having diameters in the range of less than about 4 microns and having a bulk density of less than 4 PCF to form a consistent and flowable material for metering and feeding to an extruder and for dispersing into liquid plastic in the extruder, the improvement comprises processing the bulk microfiber in a muller mill having a plough mounted in front of at least one of the mullers to form flowable agglomerates about one inch and smaller in diameter, the agglomerates having a bulk density of about 6.25 to about 9.38 PCF.

The term extruder is intended broadly to describe a mixer, usually using two or more rotating spiral screws, that pushes the mixed material out of the mixer through a die or nozzle to form continuous shapes, or into molds to form intermediate or finished parts.

The second process begins with the same bulk glass microfiber, but here the improvement comprises processing the microfiber in a self impacting mill to form a consistent flowable agglomerate material having a bulk density of about 2.5–5 PCF and agglomerates smaller than about one-half inch, resembling cotton linters.

DETAILED DESCRIPTION OF THE INVENTION

Figure 1:
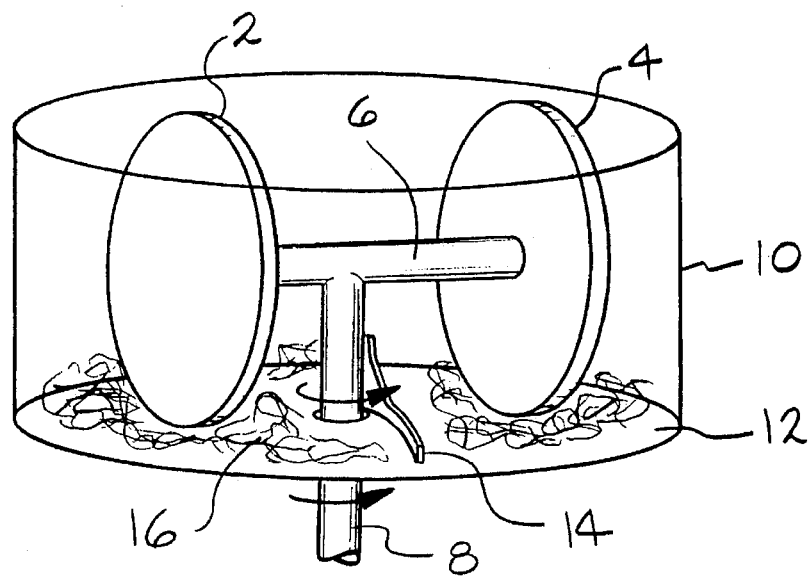
FIG. 1 is a simple schematic of a muller mill.

The muller mill used in the process of this invention is shown in FIG. 1 and uses two or more large rollers or mullers 2 having steel or rubber working surfaces 4 that work against the microfibers material to be agglomerated 16 while it is contained in a steel pan 10 under the rolling mullers 2 in a known manner. The rollers 2 are driven by adjustable spring loaded articulated or trailing arm mounted axles 6 connected to a driven shaft 8. At least one plough 14 (only one shown) mounted on shaft 8 moves above the pan bottom 12 to move material 16 into the paths of the mullers 2 and when milling is complete, to direct the milled material to an opening in the pan (not shown) to remove the milled material from the mill. The reducing action the material 16 experiences is similar to that produced by rubbing your thumb through the palm of your hand, but with much higher forces.

Figure 2:
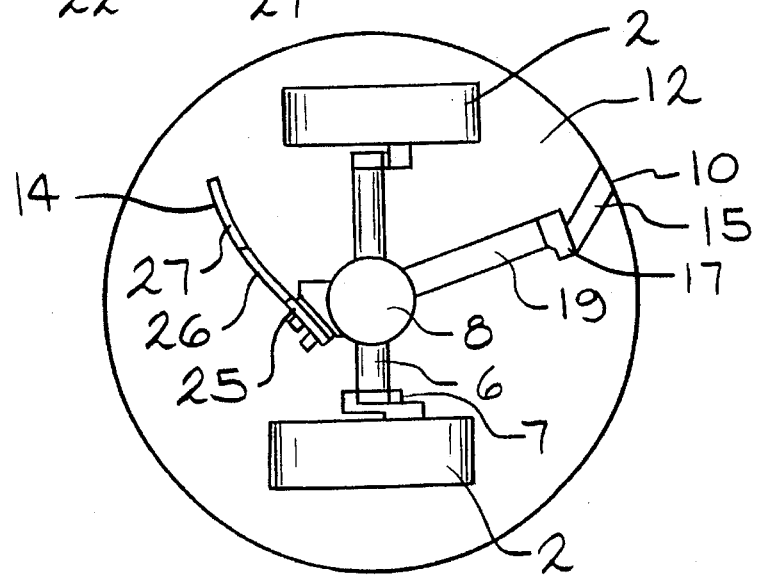
FIG. 2 is a plan view of the muller mill.

FIG. 2 is a plan view of the muller mill shown in FIG. 1 and shows the location of the plough 14 and a scraper 15 (hidden from view in FIG. 1) connected to a mounting mechanism 17 that is in turn mounted to a support arm 19 that is rigidly connected to rotating shaft 8. The scraper 15 gathers material from the extreme outside portions of the pan 10 and pulls it back towards the center and in the path of the muller wheels.

The following example sets forth the preferred method of using a muller mill in the process of the present invention.

EXAMPLE 1

A muller mill manufactured by the National Engineering Company of Aurora, Ill. was used. This mill had a pan diameter of about four feet and the rollers or mullers applied an effective force of about four hundred pounds each and were about three inches wide. In the operation of this mill in the process of this invention about thirty pounds of material, about ten-twelve cubic feet, of Code 106 bulk microfiber from Schuller International, Inc., having a mean fiber diameter of about 0.65 microns was charged into the operating four foot diameter mill in pieces of one pound and less over a period of two minutes. The material was milled for a total of thirty minutes and removed from the mill and is identified below as Sample M.

Figure 3:
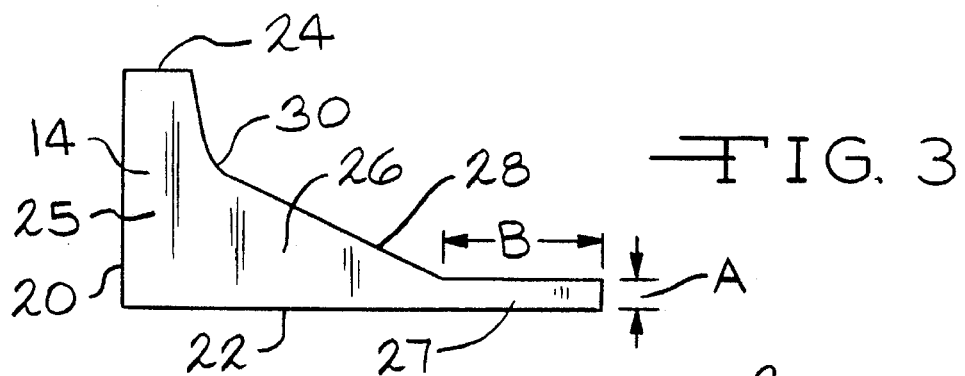
FIG. 3 is a detailed view of a preferred plough design for use on the muller mill.

One plough 14 was used in this example and the shape is shown in FIG. 3. The ploughs 14 were made from about one-eight inch steel and consisted of a connecting edge for connecting to shaft 8 in a well known manner, a bottom edge 22 that, when mounted, is spaced close to and parallel to the pan bottom 12, a top edge 24, a mounting section 25, a transition section 26 and a working section 27. The top edge 28 of the transition section 26 is inclined from one end of the working section 27 to join the mounting section 25 at a radius 30, the location of which is not critical so long as it is sufficiently high to exceed the depth of the fiber in the pan at the beginning of the milling cycle.

Dimensions A and B of the working section 27 are important for milling efficiency. Dimension B should be at least as wide as the width of the working face 4 of the mullers 2 and the working section 27 should be centered on the path of the vertical centerline of the mullers 2. Dimension A should be less than one inch and about three-eights of an inch is preferred. The plough 14 is usually slightly curved from the mounting section 25 throughout its length to the far end of the working section 27, but this is not essential. The plough usually is mounted such that a projection of its large faces intersect the pan bottom 12 at a ninety degree angle, but this is not necessary so long as the described function is performed.

The mulled agglomerates preferably are smaller than one-eighth to one-quarter inch in diameter, but often contain some pieces up to about one inch in diameter. To achieve a more homogeneous material the mulled material can be run over a vibrating screen having about one-quarter inch openings to remove the larger agglomerates or under mulled pieces for remulling as part of the bulk microfiber charge.

The other type of milling found to be satisfactory for making the desired glass microfiber product is one using the known principle of self impact. In this type of mill the work product is suspended in high velocity air streams generated by various means and directed to intersect or collide with each other, often directly opposed, causing the work product to impact each other with enough force to break or wear down the material being processed.

Figure 4:
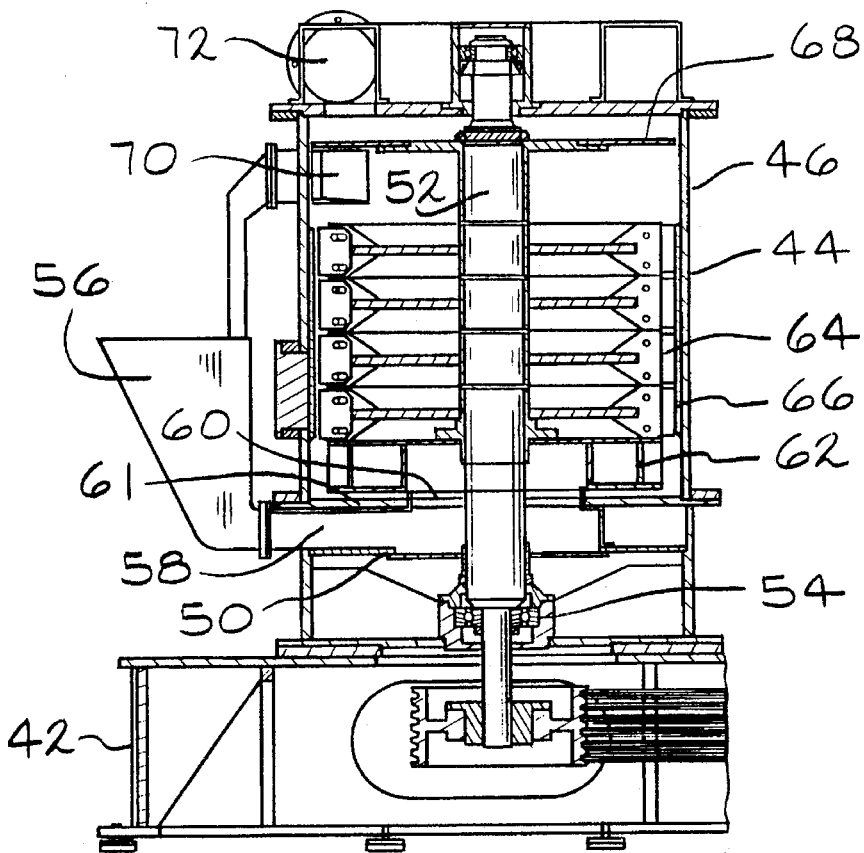
FIG. 4 is a simple schematic of the interior of a self impact mill.

A suitable mill of this type is called a Rotormill available from International Process Equipment Company of Pennsauken, N.J. A simplified partial side view of this mill is shown in FIG. 4. A housing 44 comprising a cylindrical section 46, a top 48, having an outlet 72 therein, and bottom 50 is mounted on a frame 42. A rotatable vertical shaft 52 is axially mounted with bearing assemblies 54 in the center of the housing 44 and rotated by a drive (not shown). A hopper 56 is mounted to the housing 44 for holding and metering the work product into the mill through the passage 58 and the opening 60 in intermediate plate 61.

Mounted to the shaft 52 is a fan 62 and above the fan also mounted to the shaft are a plurality of vanes 64. Adjacent the outer circumference of the vanes and mounted to the inner wall of the housing 44 is a grooved lining 66. Above the vanes, mounted to the shaft 52, is a classifier 68 with an oversize return chute port 70 positioned just underneath the classifier 68.

Figure 5:
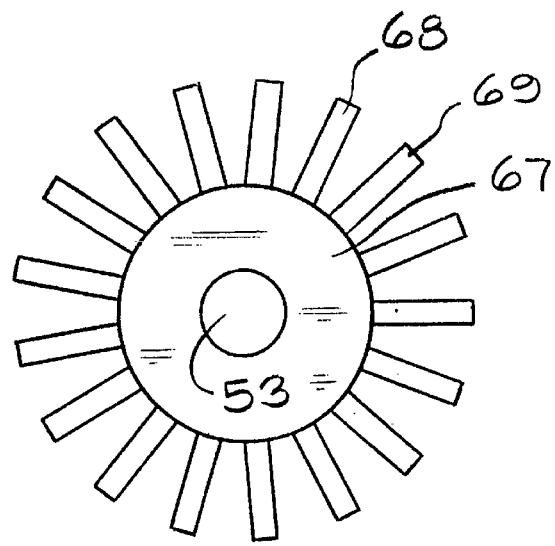
FIG. 5 is a plan view of the classifier used in the self impact mill.

The classifier 68 is shown in plan view in FIG. 5 and comprises a plurality of blades 69 mounted radially to a plate 67 which in turn is fixed to shaft 52.

In the operation of this mill the material to be processed is fed into the hopper 56 and the drive is activated and set to rotate the shaft 52 at the desired speed. The rotation of the fan 62 draws air through the material in the hopper and elsewhere causing material to flow through the path 58–60 and into the fan 62 where the material is accelerated, distributed and blown upward into the paths of the moving vanes 64. The moving vanes further accelerate the air and material causing interaction with the grooved lining 66 of the mill. This interaction creates miniature pockets of rotating air at very high velocities. This air stream causes the material, fiber clumps, to collide with each other breaking up into agglomerates and densifying to some extent.

The air stream created by the fan and the vanes carries the material out of the vane section and into the path of the rapidly rotating blades 69 of the classifier 68. The agglomerates of less than about one-quarter of an inch in diameter pass between the blades 69 and exit the mill through the outlet 72 and on to a cyclone separator (not shown) to remove the desired product from the air stream. The oversized agglomerates and under milled material are thrown outward by the blades 69 into the adjustable recycle port 70.

EXAMPLE 2

Bulk glass microfiber, Code 106 from Schuller International, Inc., having a mean fiber diameter of 0.65 microns as determined by B.E.T. surface area using Krypton as the absorbate, was torn into pieces smaller than six inches in diameter and fed into the hopper of the International Process Equipment Company's Model UR 3 Rotormill with a 100 HP motor. The mill was set up with no whizzer classifier and only three rows of vanes. The bottom two rows of vanes were blades and the third row from the bottom were called turbo. All dampers were closed except number one which was open. The feed rate was estimated to be at least 500 pounds per hour.

The resultant agglomerated microfiber had a particle size of about one-quarter inch and fines, looked similar to cotton tinters or sawdust, had a bulk density of about 4 PCF and was identified as Sample W.

EXAMPLE 3

Code 106 glass microfiber, processed in various ways as described above and including Samples M and W were made into reinforced plastic parts using the same technique. The microfiber was fed into an extruder at a target rate to produce a fiber content in the resultant part of about 5.5–6%. The resin was a thermoplastic polyester. The hot mixture was formed into parts by injection molding and the parts were then tested for properties. The properties and comments about the milling/chopping process for microfibers processed in various ways are compared in the following table.

TABLE

| Sample or Process | Commercially Feasible | Bulk Density (PCF) | Ash (%) | Annealed Shrinkage (%) | CLTE* |
|---|---|---|---|---|---|
| Control limit | Yes | +3.5 | 5.5–6 | .65 | 77 |
| Chopped | No-blade life | 8.1 | 5.6 | .54 | 61 |
| Ball milled | Yes | 8.1 | 5.7 | .85 | 89 |
| Hammer milled | No-fluff | 2 | ** | ** | ** |
| Sample M | Yes | 7 | 5.9 | .61 | 75 |
| Sample W | Yes | 4 | 5.7 | .51 | 67 |

*Coefficient of linear thermal expansion (micron/meter/degree C.).
**Because the bulk density was too low this material could not be fed into the extruder.

The ash test reveals the amount of glass microfiber in the reinforced plastic part. The annealed shrinkage reveals the thermal stability of the reinforced plastic parts which is critical to performance and appearance. If the part shrinks excessively the first time it gets hot, warpage of the part can occur and joints will open up, both of which are objectionable. The CLTE is another indication of thermal stability and although reversible, if too high, the parts will warp when hot, causing the part to look bad and possibly to be damaged.

It is not known precisely why the glass microfibers processed in different ways produced different results in the reinforced plastic parts since about the same amount of glass microfiber was in all parts, but it is believed it has something to do with the fiber length distribution and the degree to which the fibers disperse in the resin matrix. It can be seen that the chopped fiber performed best, but this method of preparing the microfibers is not commercially feasible. The data shows that conventional ways of making 10–23 micron milled glass fiber did not produce satisfactory product for reinforced plastic parts having a very smooth surface, but that the muller milled and the Rotormilled glass microfiber is suitable.

What I claim is:

1. In a process of converting bulk form glass microfibers having a mean fiber diameter less than about 1.0 micron and having a bulk density of less than 4 pounds per cubic foot to form a consistent and flowable material for metering and feeding into an extruder and for dispersing into liquid plastic in the extruder, comprising processing the bulk microfiber in a muller mill having a plough in front of at least one muller to form agglomerates about one quarter of an inch in diameter and smaller having a bulk density in the range of about 6.25 to about 9.38 lbs. per cubic foot.

2. The process of claim 1 wherein the bulk density of the agglomerates is about 7 PCF.

3. The process of claim 1 wherein the mean diameter of the fibers is below about 0.65 microns.

4. Agglomerates of glass microfibers, the microfibers having fiber diameters below about 1 micron, the agglomerates having a bulk density in the range of about 6.25–9.38 lbs. per cubic foot and having been produced by the process of any one of claims 1, 4, and 5, which agglomerates, when added to plastic resins in amounts of about 5.5–6 wt. percent and formed, result in parts having very smooth surfaces.

5. In a process of converting bulk glass microfibers having fiber diameters below about 4 microns and having a bulk density below about 4 lbs. per cubic foot to a free flowing material, the improvement comprising forming agglomerates having diameters not exceeding about one-quarter inch and having a bulk density in the range of about 2.5–5 lbs. per cubic foot-by processing microfiber having a mean fiber diameter of 1 micron or less in a mill causing the fiber to be entrained in high velocity air streams that collide with each other to break down said bulk microfiber and to form said agglomerates and wherein said mill has a grooved lining and moving vanes and wherein said microfiber is drawn into said device, accelerated, distributed and blown into the paths of the moving vanes by a moving air stream and wherein said moving vanes further accelerate said microfiber causing interaction with said grooved lining causing clumps of said microfiber to collide with one another causing breaking up and densifying of the microfiber into said agglomerates.

6. The process of claim 5 wherein the mean diameter of said microfibers as measured by B.E.T. surface area, using Krypton as the adsorbate, is less than about 1 micron.

7. The process of claim 6 wherein the bulk density of the agglomerates is about 4 pounds per cubic foot.

8. The process of claim 7 wherein the mean diameter of the microfibers is no greater than about 0.65 microns.

9. The process of claim 6 wherein said mill further comprises a cyclone separator to remove said agglomerates from the air stream after said air stream carrying said agglomerates has exited said grooved lining.

10. The process of claim 1 wherein said mill further comprises a cyclone separator to remove said agglomerates from the air stream after said air stream carrying said agglomerates has exited said grooved lining.

11. The process of claim 8 wherein said mill further comprises a cyclone separator to remove said agglomerates from the air stream after said air stream carrying said agglomerates has exited said grooved lining.

12. The microfiber product produced by the process of any one of claims 7 and 9–13, which product, when added to plastic resins and formed, results in parts having very smooth surfaces.

* * * * *